Feb. 22, 1949.   K. RAUCH   2,462,284
CHUCK
Filed June 13, 1947

INVENTOR.
Konrad Rauch
BY Edward J. Noe
atty.

Patented Feb. 22, 1949

2,462,284

UNITED STATES PATENT OFFICE 2,462,284

CHUCK

Konrad Rauch, Dayton, Ohio, assignor to The Sheffield Corporation, Dayton, Ohio, a corporation of Ohio Application June 13, 1947, Serial No. 754,432

6 Claims. (Cl. 279—44)

This invention relates to holding devices such as chucks adapted to releasably hold a workpiece or tool in secured position.

One object of the invention is the provision of a chuck having relatively movable members that receive a part to be held and in which one of the members is moved to clamping engagement with the part by means of a simple toggle connection.

Another object is the provision of a chuck having a body member provided with a substantially V-shaped notch and cooperating with a substantially V-shaped clamping member by means of which a holding pressure is applied to the part to be held.

Another object is the provision of a chuck of the character mentioned in which a pair of rollers with a spreading roller between the pair is provided for moving the clamping member into clamping engagement with the part held.

Still another object is the provision of a chuck of the character mentioned having a pair of spaced rollers with a spreading roller of larger diameter arranged to move the clamping member to clamping position on the part, the adjustment of the clamping member, to provide for parts of different diameters, being provided by a readily removable spacing block engaged by one of the rollers.

Figure 1:
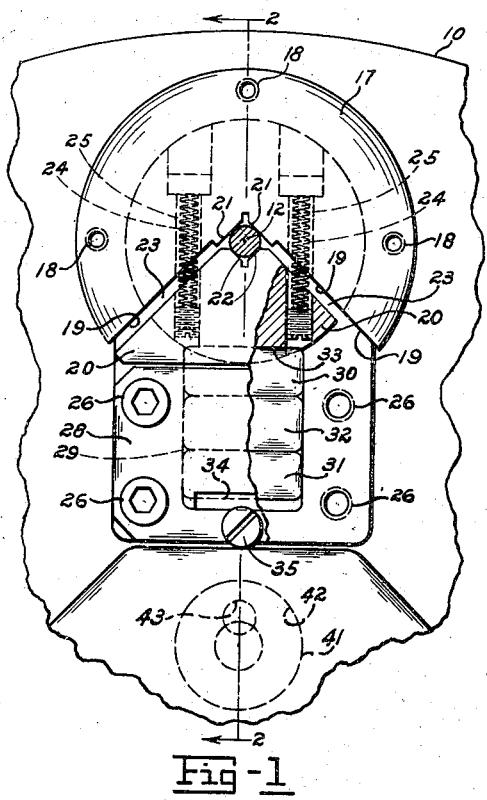
Figure 2:
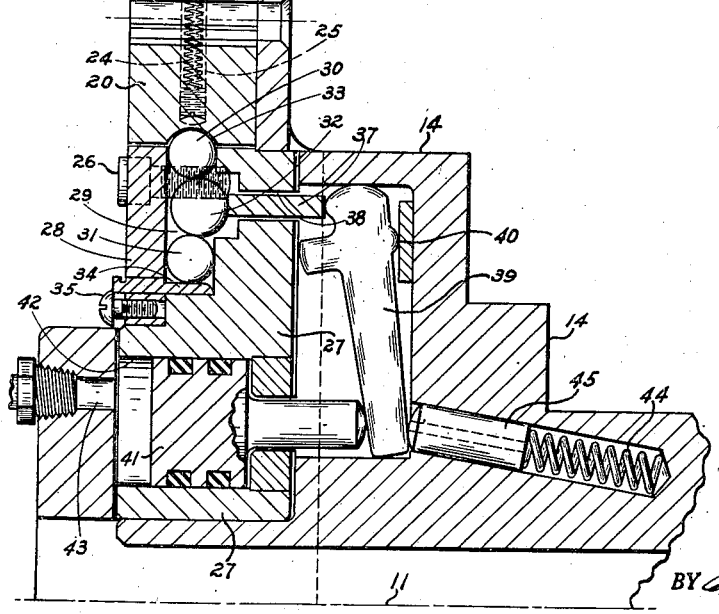

Other objects and advantages of the invention will be apparent from the following description, the appended claims, and the accompanying drawing, in which:

Fig. 1 is a plan view of a portion of a machine tool having a chuck embodying the present invention; and Fig. 2 is a section on the line 2—2 of Fig. 1.

Referring more particularly to the drawing in which the same reference numerals have been applied to the like parts in the various views, 10 generally designates a body portion such as a carrying disc or table on which one or more workpieces or tools are to be carried for a convenient machining operation. In its present embodiment, the body member 10 is a rotatable table adjustable about an axis 11 to carry a series of workpieces 12 in an annular path from one machine operation to another.

The body member comprises a hub portion 14, a back plate 15, an annular housing 16, and a work holding member 17, all fixed with respect to one another. The work holding member 17, as shown, is a segmental block fixed as by means of bolts 18 to housing 16 and back plate 15 and having a substantially V-shaped notch 19. Arranged for movement in the notch 19 is a substantially V-shaped clamping member 20. The members 17 and 20 are provided with work holding surfaces 21 and 22 respectively, arranged preferably 90 degrees apart, and so positioned that normally when a part of the intended size is in place, there is a clearance space 23 between the sides of the members, as shown in Fig. 1. Springs 24 are arranged in passages 25, and normally act to separate the members to free the part 12 from clamped engagement. Means are provided to move the clamping member 20 towards the part 12 and into firm clamping engagement.

The moving means for the clamping member 20 comprises a simple system of rollers providing a toggle action so that the small normal spacing between the part 12 and the work holding surfaces 21 and 22 can be positively taken up and adequate holding pressure exerted on the part so that the latter will be very firmly held in its intended position. These operating rollers are arranged in a roller chamber 29 in an insert block 27 which is rigid with the back plate 15 and the hub portion 14. A retainer plate 28 is removably secured as by screws 26 to the insert block 27 and serves as a retainer wall for the rollers. In the roller chamber 29 is a pair of operating rollers 30 and 31 preferably of the same diameter, and between these rollers is a spreading roller 32, which, as shown, is somewhat larger in diameter than the rollers 30 and 31. Roller 30 is partially received in a roller receiving recess or groove 33 in the clamping member 20 so that the clamping member is thus operably mounted and only has a limited movement in the direction of the axis of part 12 or, in other words, away from the back plate 15. Roller 31 engages a spacing block or strip 34 which is removably held in the retainer plate 28 by means of a screw 35 threaded in the insert block and having a head portion that overlaps the end of the spacing strip. The thickness of the spacing strip 34 where it engages the roller 31 can be made the proper size according to the diameter of the part 12 to be clamped in the chuck. A spacing strip of the required size is selected and applied according to requirements.

In the normally released position of the chuck, the spreading roller 32 has its axis substantially displaced from the plane containing the axes of the rollers 30 and 31. When the part is to be clamped, the spreading roller 32 is moved to the left to the position shown in Fig. 2 in which its axes is brought almost into the plane containing the axes of the rollers 30 and 31, but not quite into that plane. The thickness of the spacing strip 34 is such that when the part 12 is firmly clamped the roller 32 is slightly spaced away from the retainer plate 28. If a part is smaller in diameter than the intended size, the spreading roller 32 can move into contact with the retainer plate but since the spreading roller 32 is of larger diameter than the rollers 30 and 31, the axes of all three rollers will never be brought quite into alignment and when clamping or spreading pressure is removed from the roller 32, the latter can be moved to releasing position by the action of the springs 24.

The roller 32 is positively operated by a controlling pin 37 axially movable in a hole 38 in the insert block 27. The outer end of the pin 37 is moved by a lever 39 fulcrumed at 40 and controlled by a suitable means. In the form shown this adjustment means is a piston 41 operating in a cylinder 42 formed in the insert block. Fluid pressure is supplied through supply passage 43 to move the piston to the right, swinging the lever 39 counter-clockwise and clamping the part 12. When the fluid pressure is released a spring 44 operates a pressure pin 45 against the lever 39, moving it clockwise to release the spreading roller 32 and thus permit the pair of rollers 30 and 31 to move closer to one another and release the part 12.

As will be apparent, the rollers operate as a toggle, giving tremendous clamping pressure and moving the clamping member 20 into very firm holding engagement with the part 12. In the particular form of toggle device herein disclosed, the parts are very readily made, since there is no requirement for pivot mountings or other intricate constructions of a precise character.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A chuck comprising a body member having a substantially V-shaped notch, a substantially V-shaped clamping member operably mounted in said notch, said members having cooperating holding surfaces for gripping a part to be held, and means operable to apply a holding pressure on said clamping member in the direction of said part.

2. A chuck comprising a body member having a substantially V-shaped notch, a substantially V-shaped clamping member operably mounted in said notch, said member having cooperating holding surfaces for gripping a part to be held, and a toggle connection between said members for applying a holding pressure in the direction of said part.

3. A chuck comprising a body member having a substantially V-shaped notch, a substantially V-shaped clamping member operably mounted in said notch, said members having cooperating holding surfaces for gripping a part to be held, a pair of parallel spaced rollers one engaging a portion of the body member and the other engaging a portion of the clamping member, a spreading roller between the rollers of said pair, and means to move the spreading roller to adjust its axis toward the plane containing the axes of the rollers of said pair for adjustment of said clamping member toward the part.

4. A chuck comprising a body member having a substantially V-shaped notch, a substantially V-shaped clamping member operably mounted in said notch, said members having cooperating holding surfaces for gripping a part to be held, a pair of rollers one bearing against the body member and the other bearing against the clamping member, a spreading roller having a diameter greater than the diameter of the rollers of said pair and arranged between the rollers of said pair, and means for positively moving the spreading roller almost to the plane containing the axes of the rollers of said pair.

5. A chuck comprising a segmental body member having a substantially V-shaped notch, a substantially V-shaped clamping member operably mounted in said notch, said members each having a pair of angularly related flat cooperating holding surfaces for gripping a circular part to be held, a roller receiving socket in said clamping member, a roller partially received in said socket, a second roller parallel to and spaced from said first roller, a removable spacing strip interposed between said second roller and said body member, said rollers constituting a pair, a spreading roller between said pair of rollers for clamping the clamping member to the part and means for operating said spreading roller.

6. A chuck comprising a segmental body member having a substantially V-shaped notch, a substantially V-shaped clamping member operably mounted in said notch, said members each having a pair of angularly related flat cooperating holding surfaces for gripping a circular part to be held, a roller receiving socket in said clamping member, a roller partially received in said socket, a second roller parallel to and spaced from said first roller, a removable spacing strip interposed between said second roller and said body member, said rollers constituting a pair, a spreading roller of larger diameter than the rollers of said pair and arranged between said pair, means for operating the spreading roller transversely of its axis to spread the said pair and thus move the clamping member against the part, and yielding means for urging the clamping member to release position.

KONRAD RAUCH.

REFERENCES CITED

The following references are of record in the file of this patent:

UNITED STATES PATENTS

| Number | Name | Date |
|---|---|---|
| 1,015,254 | Whisler | Jan. 16, 1912 |
| 2,068,185 | Kreis | Jan. 19, 1937 |
| 2,306,092 | Throp | Dec. 22, 1942 |
| 2,429,091 | Dodge et al. | Oct. 14, 1947 |